Figure 1:
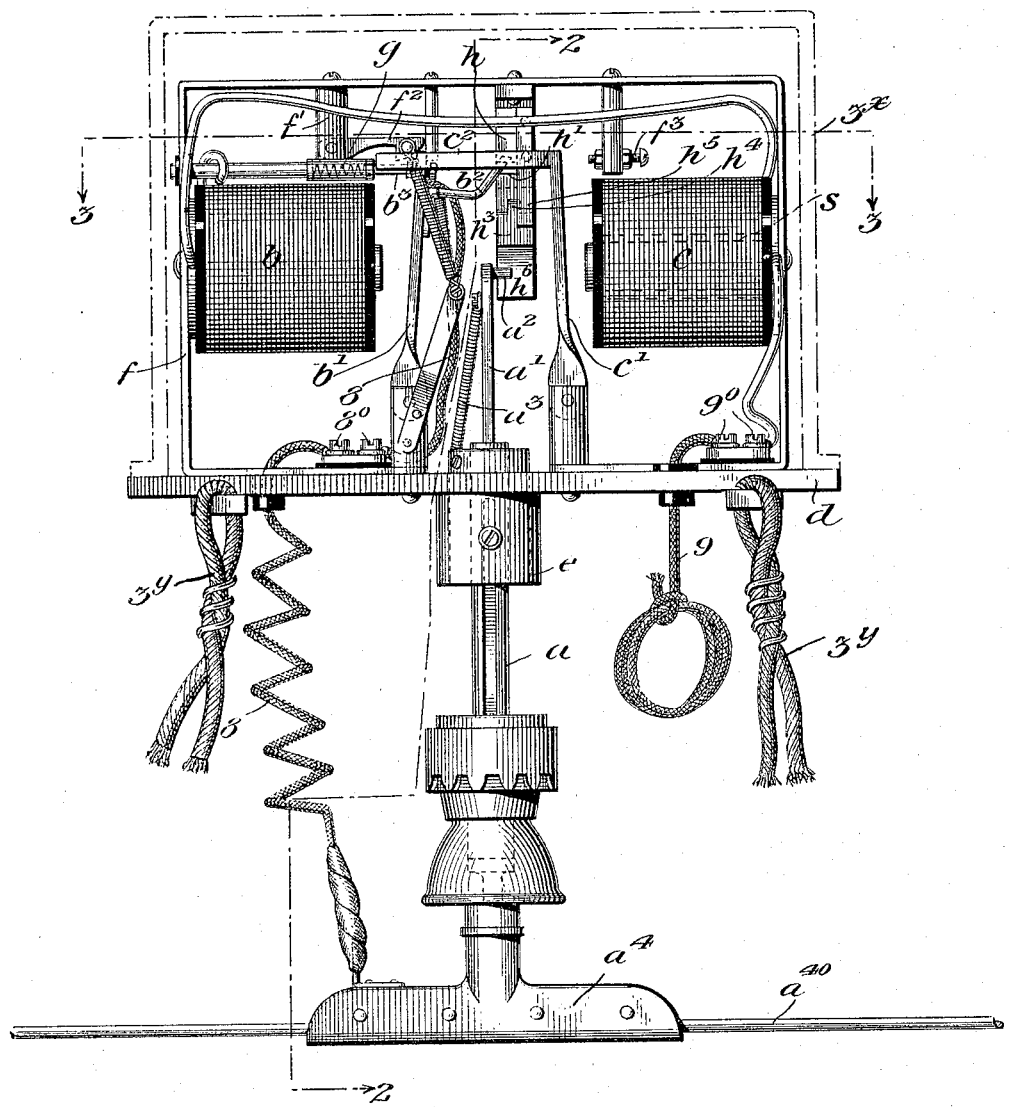

C. W. WARD.
ELECTRICAL SIGNALING SYSTEM AND APPARATUS.
APPLICATION FILED NOV. 1, 1911.
1,156,334.
Patented Oct. 12, 1915.
3 SHEETS—SHEET 2.
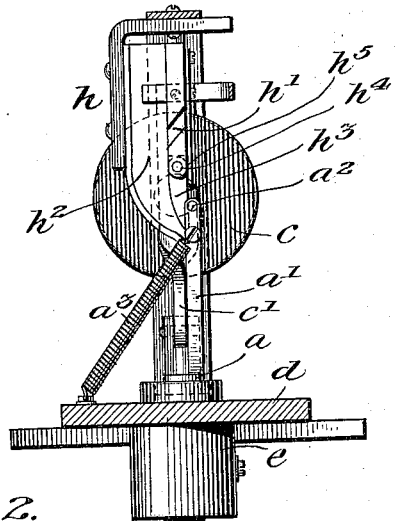
Fig. 2.
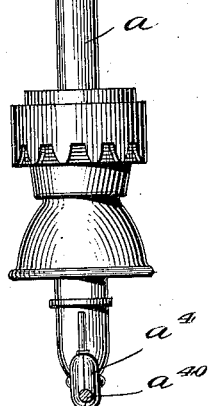
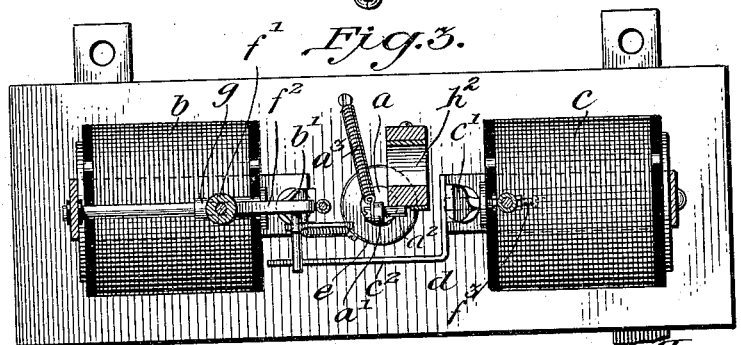
Fig. 3.
Witnesses:
Inventor:
Charles W. Ward
by Edward E. Clement
Atty.

C. W. WARD.
ELECTRICAL SIGNALING SYSTEM AND APPARATUS.
APPLICATION FILED NOV. 1, 1911.
1,156,334.
Patented Oct. 12, 1915.
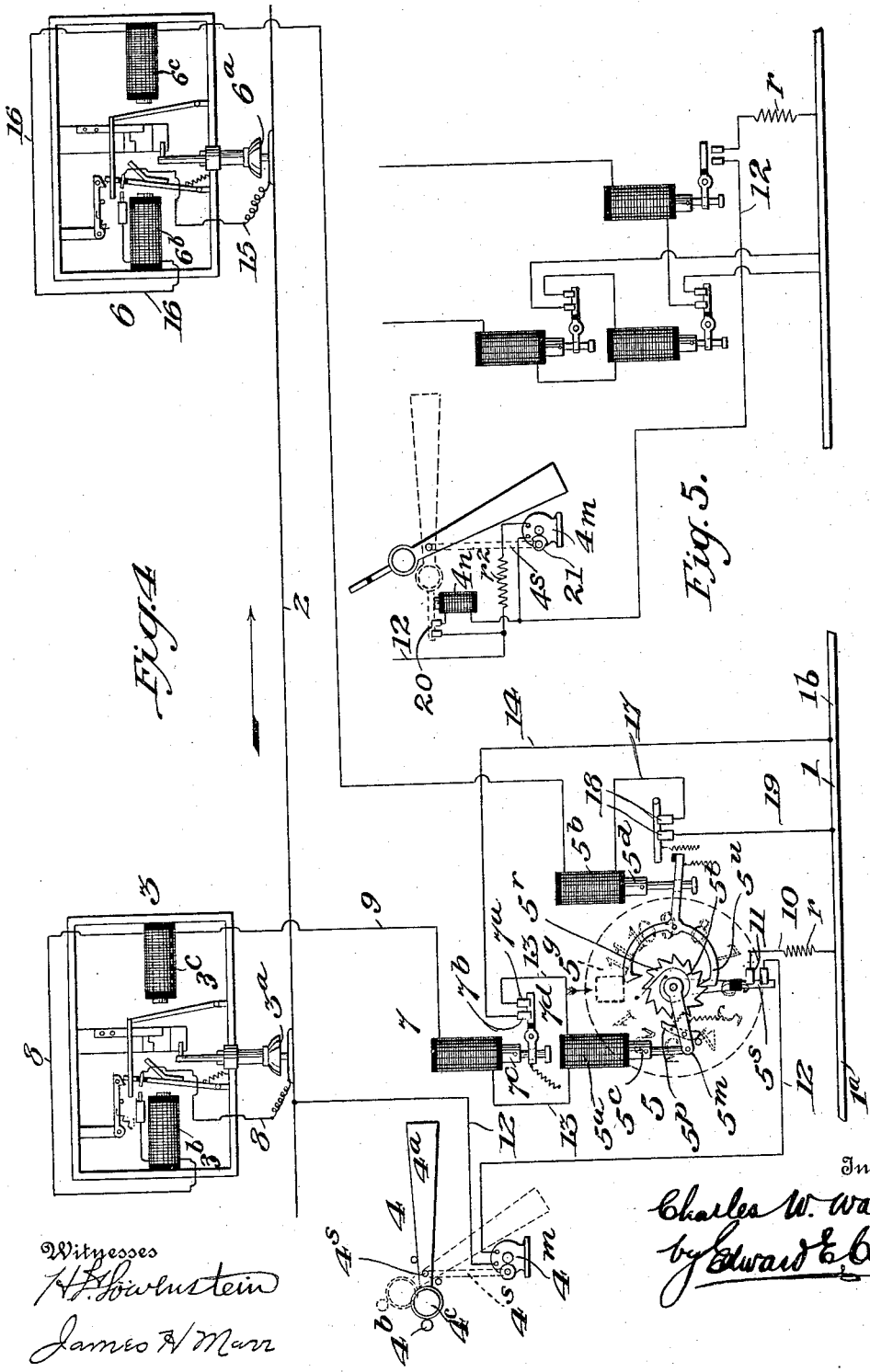

UNITED STATES PATENT OFFICE.

CHARLES W. WARD, OF LAKEWOOD, OHIO.

ELECTRICAL SIGNALING SYSTEM AND APPARATUS.

1,156,334.  Specification of Letters Patent.  Patented Oct. 12, 1915.

Application filed November 1, 1911. Serial No. 658,048.

*To all whom it may concern:*

Be it known that I, CHARLES W. WARD, a citizen of the United States, residing at Lakewood, in the county of Cuyahoga and State of Ohio, have invented certain new and useful Improvements in Electrical Signaling Systems and Apparatus, of which the following is a specification, reference being had therein to the accompanying drawing.

My invention relates to electric signaling systems and especially to electric block signaling systems.

The objects of the invention are to provide a reliable, efficient, and simple arrangement of circuits and apparatus of the type mentioned; to adapt such circuits and apparatus for operation by the working currents at the voltages usually employed in interurban electric railway systems; to improve the structure and operation of the block signals or semaphores employed; and to prevent the complete breaking down of the block limitation by permissive signals, and to indicate the number as well as the presence of cars or trains in a block.

I attain my objects in the following manner: I produce a very simple and reliable arrangement of the circuits by placing the operating, locking or controlling, and counting-in magnets in series at the entrance to a block, and the operating, locking or controlling, and counting-out magnets in series at the end of the block. Contactors are provided connected directly with the trolley wires, each contactor being adapted when pushed up by the trolley pole of a passing car, to connect the trolley wire with the series arrangement referred to, current being from the main generator circuit at working voltage without any complicated arrangements. The semaphore arms are driven through friction gears or mutilated pinions by means of electric motors under the control of the counting-out magnets or solenoids. They are so arranged that they will go to danger in case of any derangement of the apparatus or circuits.

My invention is illustrated in the accompanying drawings in which—

Figure 1 is a side view of the contact device employed in my system. Fig. 2 is a vertical transverse section on the line 2—2 of Fig. 1 looking to the right. Fig. 3 is a horizontal section on the line 3—3 of Fig. 1 looking downward. Fig. 4 is a diagram of a portion of the system showing the equipment for one block.

Referring first to Fig. 4, 1 designates a track rail, which from $1^a$ to $1^b$ is supposed to represent that portion of the railroad comprised within a single block. 2 designates a trolley wire, supposed to be supported on as many hangers as may be required, none of which are shown. At the end of the block, in place of two of the hangers, are contact devices which I shall presently describe, one of which is illustrated in Figs. 1 to 3. In the diagram of Fig. 4 the movement of cars is supposed to be in the direction of the arrow placed above the trolley wire 2, and the entrance to the block is therefore at the left hand side of the figure, where are located the contact device 3, the semaphore 4 and the counting device or number indicator 5. The end of the block at the right hand side of the figure is equipped with the contact device 6 only. When a car enters a block, the upward thrust of its trolley pole pushes up the plunger $3^a$, closes a circuit thereby extending through the magnets $3^b$ and $3^c$ in series, thence to a solenoid 7 adjacent the number device 5, thence through a solenoid $5^a$ of the number device, thence through switch contacts $7^a$ and $7^b$ controlled by the solenoid 7, and thence to the rail 1 or other common return. The magnets $3^b$ and $3^c$ are energized, $3^b$ serving to maintain the continuity of the circuit through itself. Solenoid $5^a$ works the number indicator to show that one car has entered the block, and at the same time cuts off current from the motor $4^m$ of the semaphore, which stops, and permits the semaphore arm $4^a$ to rise into its position of danger. When the car reaches the end of the block, its trolley pole pushes up the plunger $6^a$ of the contact device 6, and thereby closes a circuit in series through the magnets $6^b$, $6^c$ of the contact device, and the solenoid $5^b$ of the number indicator at the entrance to the block. The result of this is to work an escapement on the number indicator so as to set it back one step, whereupon the circuit of motor $4^m$ becomes reëstablished, the semaphore arm is drawn down to safety, and the block then shows clear in every respect to later approaching cars. Should it be desired to have more than one car enter the block at once, this can be done under "cautionary" orders, and as the second car approaches the crew can observe the number indicator 5 which will show the number of cars already in the block. In order that the circuit closing operation may be repeated by each car in succession, the solenoid 7 is made to break its own circuit at the contact $7^a$, $7^b$ for a determinate time which is made long enough to cover the necessary operation of all the other parts. Each car as it goes out of the block will then step back the indicator one step, by means of the magnet $5^b$.

Having given this brief outline of the operation of the system I will describe in detail the mechanical construction of the contact device shown in Figs. 1 to 3, which is the most important and in fact essential element in the system. It is necessary that this contact device should be positive in its action, that it should operate both mechanically and electrically when a car passes, so that its functions will be properly performed even though current is for the moment cut off, and it must be so designed as to cause no shock to the passing trolley poles, and not to be vibrated unduly thereby. The device which I have shown herein has proven to be satisfactory in practice, and answers these requirements very well. It consists essentially of a slotted plunger $a$ working in a sleeve $e$ secured to the plate $d$, upon which is mounted a frame $f$ carrying magnets $b$ and $c$, a spring contact device $g$, armatures $b'$ and $c'$, and a reversing guide $h$, into which works a pin $a^2$ on a pivoted connecting rod $a'$ carried on the head of the plunger $a$. Pivoted in a hanger $f'$ secured to the top of the frame is a horizontal latch $f^2$, adapted to engage the armature $b'$ when it is approaching the magnet $b$, and hold it against retraction, with the armature contact $b^3$ touching the fixed spring contact $g$ and thus completing the circuit through the magnets $b$ and $c$. Projecting from the armature $c'$ is an arm $c^2$ which underlies a lateral stud or pin on the head of the latch $f^2$, whereby the attraction of the armature $c'$ will result in lifting the latch $f^2$. The extent of movement of the armature $c'$ is limited by an adjustable stop screw $f^3$ in a hanger on the frame. When both magnets $b$ and $c$ are energized, the latch $f^2$ is lifted mechanically, but both armatures are of course held magnetically. The circuit is first closed however by mechanical means only, the head of the connecting rod $a'$ traveling up along the face of the guide $h$ until it strikes a cam arm $b^2$ projecting from the back of the armature $b'$, and forces said armature toward the pole piece of the magnet $b$, thereby closing together the contacts $g$ and $b^3$, and at the same time latching the armature $b'$ by means of the latch $f^2$. The rod $a'$ travels on as the plunger $a$ rises until its stud $a^2$ reaches an opening $h'$ in the guide, into which the stud passes, being drawn backward by the spring $a^3$. The plunger $a$ in falling after a car has passed, draws down the rod $a'$, but the stud $a^2$ having passed backward through the slot $h'$ in the guide, comes down in the space $h^2$ (Fig. 2), out of line with the arm $b^2$, and therefore out of position to further affect any of the other parts. As the stud approaches its lowermost position, it strikes the inside of a gate $h^3$ hinged at $h^4$ on the body of the guide and normally pressed inwardly by the leaf spring $h^5$. This gate swings outwardly, permitting the stud to pass out onto the face portion $h^6$, and the gate then springs back into its normal position so that when the stud starts up again it will be forced over the gate on the outside face of the guide. The function of the latch will now be fully understood. This device operates by means of the working current supplied to the trolley wire of the railway. It sometimes happens that current is momentarily interrupted, either in the feeder for some particular section, or in the main, and at times the current supply to a particular section or block may be weakened because of shunting by many other cars in adjacent blocks. It is highly necessary therefore that the contact device should be set mechanically as stated, when the car enters the block, and then when current again comes on or when it becomes strong enough to energize the magnets $b$ and $c$, the armatures $b'$ and $c'$ will be at once thrown up forcibly, the latch $f^2$ will be tripped by the arm $c^2$, and the car indicator of Fig. 4 as well as the semaphore arm $4^a$ will immediately be operated. The same holds of the contact device 6 at the end of the block. With no current, the cars would of course be stationary anyhow, but assume a car to have run into the block, or to have run out of the block, just at or immediately after the cutting off of current, its cutting on would immediately be followed by the proper signals as the cars resume running.

The armature $c'$ and its lever $c^2$ are provided with no retractile spring in the form shown, although the latch $f^2$ has a spring which indirectly acts upon the armature $c'$ through laterally projecting pin $f^3$ to retract. It is to be observed however that the armature $b'$ has a retractile spring, and also that it must be retracted more quickly than the armature $c'$, which is to say more quickly than the latch $f^2$, so as to prevent relatching and the giving of false signals thereby. This retarding of the operation of the latching means may be effected in any other well known manner such as increasing the mass of the moving parts or providing a copper or other conducting sleeve around the core of the magnet $c$ such as indicated at $s$ in Fig. 1.

The sleeve $e$ is shown provided with a stop screw tapped into it from the side and having its point engaging in a slot in the plunger $a$ to limit the travel of the latter. This and other details are of course subject to modification or substitution without departure from the spirit of the invention. Stop collars are somewhat better than a stop screw and I prefer to employ them as a rule. For the most part, the clamping device and insulator shown at the lower end of the plunger $a$, are of standard type and form no part of the present invention except as they contribute to the general result. The clamp shown is a standard Westinghouse four-screw clamp, hung below a suitable insulator, and the clamp is directly connected by means of the wire 8 through terminals $8^o$ on the base $d$ to the armature contact $b^3$. When this contact is closed on the spring plunger contact $g$, a circuit is complete from the trolley wire 2 and the clamp $a^4$ through the magnets in series, and this circuit is self-controlled by the magnet $b$, whose continued energization keeps the contacts $b^3$ and $g$ together. The circuit continues from the magnet $c$ by way of the conductor 9 through terminals $9^o$, to the solenoid 7 of Fig. 4.

In studying the relation of the parts $b'$, $c'$, $b^2$, $c^2$, $f^2$ and $a'$, particular attention should be paid to Fig. 3 which shows all these parts in plan very clearly.

Turning to the diagram, Fig. 4, the other mechanical parts may be briefly described as follows: The semaphore 4 comprises a pivoted arm $4^a$ having a counterweight $4^b$ and a glazed ring $4^c$ which may contain red glass adapted to swing in front of a light when the arm goes to danger. Normally, when under no restraint, the arm $4^a$ will tend to rise always into its horizontal position indicating danger. It is held out of this position by a friction driven connection between the motor $4^m$ and the shaft $4^s$ of the arm, which is indicated in dotted lines. A mutilated gear, belt, or other device may be substituted for the friction gears shown, the requirement being that after the arm is drawn down, the continued running of the motor will not perform any further work. Of course with the friction gears enough slip is permitted to let the motor run on while the arm remains stationary. The motor circuit is shown at 10, 11, 12, being controlled at the contacts 11 by a movable switch arm $5^s$ rigidly connected to the ratchet wheel $5^r$ of the indicator 5, so that whenever the indicator is set forward to show one or more cars in the block, the motor circuit is open and the semaphore arm free to swing up into its danger position. The solenoid 7 has a sliding core $7^c$ controlling the lever $7^d$, the end of which constitutes a switch blade for the contacts $7^a$, $7^b$, included in the circuit 8, 9, 7, 13, $7^a$, $7^b$, 14, 1. The function of the solenoid 7 is to break this circuit, thereby deënergizing not only itself but the contact magnets $3^b$ and $3^c$, after a predetermined length of time from their first energization. This length of time should be sufficient to permit the action of the indicator 5, and may be regulated by means of a dashpot or other retarding device on the core. The solenoid $5^a$ has a movable core $5^c$ connected by a suitable link to the end of a pawl lever $5^m$, carrying a pawl $5^p$ engaging the ratchet $5^r$, and adapted to turn said ratchet one step for each energization of the solenoid $5^a$. The ratchet is provided with a retractile spring $5^t$, and when set is held against the tension of said spring by means of a pallet $5^u$, forming part of an anchor escapement controlled by the movable core $5^d$ of the solenoid $5^b$, energized from the contact device 6 at the end of the block. Each time the solenoid $5^b$ is energized, the escapement lever is lifted, permits the ratchet $5^r$ to retract a half step, then breaks the energizing circuit of the solenoid $5^b$ at the contacts 18, whereupon the escapement lever is permitted to drop and the ratchet takes another half step, thereby retracting its connected parts through one half step. It should be noted that the pawl $5^p$ is normally out of engagement with the ratchet wheel, so as to permit retraction of the latter as stated. Fixed on the same spindle or otherwise rigidly secured to the ratchet $5^r$, is the switch arm carrying the contact blade $5^s$ which is normally held in engagement with the contacts 10—11 to close the motor circuit. This blade is properly insulated from the arm and the actuating mechanism. Also connected to the ratchet and its spindle is a number disk or indicator card $5^g$, bearing numerals around its periphery which are normally concealed behind a suitable face plate, but which are brought into view serially as the ratchet is turned step by step, being exposed through a small window $5^w$ in the face plate. The parts $5^g$ and $5^w$ are shown only in dotted lines, but it will be understood that these parts, together with the ratchet and its actuating mechanism, the switch $5^s$—10—11, the solenoids $5^a$—$5^b$ with their connected parts, and preferably the solenoid 7, are all housed in a suitable box located at one side of the track at the entrance to the block. This box may be of iron or other metal, painted or coated and hermetically closed to resist the weather, the only opening in the front or door of the box being through the window $5^w$, which shows the number of cars that are in the block at any given instant. Assuming that several cars have passed, the ratchet will step forward one step for each car, that is to say for each closure of the circuit by the contact device 3, and the proper number on the card $5^g$ will thereby be exposed through the window. As the cars pass out of the block, successive contacts at the device 6 will step back the ratchet, and therefore set back the numbers one by one, until the card is again in zero position, showing a blank or clear block. The semaphore arm $4^a$ remains up while there are any cars in the block, but is pulled down to "clear" as soon as the blade $5^s$ reaches the contacts 10—11, the card then being in zero position.

In Fig. 5 I have shown a simplified arrangement of part of the circuit of Fig. 4, which is substantially the same excepting that the car counting device is omitted and that means are provided for relieving the motor of its load after the semaphore has been raised, and at the same time holding the semaphore in this position at minimum expenditure of energy. This means consists of an electromagnet $4^n$ having its circuit arranged in shunt of the motor and controlled by a switch 20 which acts to close the same when the semaphore reaches its "clear" position, and a mutilated gear 21 so arranged on the shaft $4^s$ as to permit the motor to run idly while the semaphore is held at "clear". In order that the magnet $4^n$ will have a shunting effect upon the motor circuit, I place a resistance $r$ in series with both circuits, and include in the motor circuit a resistance $r^2$. It will thus be seen that this arrangement also fulfils the requirement of failure on the side of safety in the same manner as the arrangement of Fig. 4, namely, by virtue of the semaphore being held at clear through the maintenance of the circuit 12.

I am aware that many changes and modifications may be made in the circuits thus described, and some changes in the apparatus without departing from the spirit of my invention, and it is to be understood that I contemplate all such changes as fall fairly within the scope of the appended claims.

As already stated, I consider the contact device shown in Figs. 1 to 3 a very important feature of the invention, and it has been carefully designed with a view to giving constant and efficient service under hard conditions, even with a high speed service. I have found in practice that the plunger $a$ commences to rise with the trolley wire while the approaching car is at some distance, and falls gradually as the car recedes into the block. This gives a very smooth positive action, quite different from the action of previous devices in which only a momentary contact is effected by the trolley wheel or pole in passing. Furthermore, the first action of the plunger in closing the contacts $b^3$ and $g$ being purely mechanical, and this contact being maintained by the latch $f^2$ until current again comes on, there is no possibility of a false signal or of any accident in the block, when current again comes on, because to set the device a car must have passed into the block, and if current is then cut off entirely from the section, the car will remain there until power is again supplied, and in passing out of the block will unset the apparatus normally; while if the apparatus fails to work properly so as to retire the signals, this condition will make itself immediately manifest by a permanent block, leading to immediate correction. Any accident to the motor circuit or motor would produce the same result, as would also any failure of the magnets $3^b$, $3^c$, 7 or $5^b$ to operate.

It should be stated in closing that I have deemed it unnecessary to fully illustrate or describe certain auxiliary features, such as the cover of the contact device in Fig. 1 which is indicated by dotted lines at $3^x$, or the means for supporting or suspending the device over, beneath, or to one side of the track, which are indicated by the ends of cables $3^y$. The arrangement illustrated and described is of course specific to an overhead trolley system, and in making use of it for a third rail system or a slot system, the device might be inverted and must be suitably supported.

In the claims hereto appended, the expressions "trolley support" or "hanger" include third rail supports and the like, and the expression "suspended" means supported in any suitable manner, which of course in a trolley system would be by wires or cables as shown.

Having thus described my invention what I desire to secure by Letters Patent is:—

1. A trolley actuated switch comprising relatively movable contacts, an operating member therefor having a determinate total range of operative movement and having operative engagement with said contacts through a portion of said movement only, an electric circuit controlled by said contacts, and a latch temporarily retaining said contacts in the positions to which they are moved by said operating member, together with tripping means controlled from said electric circuit to trip said latch and free the contacts therefrom.

2. A contact device comprising a support, normally separated contacts, means adapted to be actuated by a passing car for closing said contacts together, mechanical means for maintaining said contacts in engagement when initially closed, and electromagnetic means controlled by said contacts and adapted when energized to disengage said mechanical means and maintain said contacts closed independently.

3. A contact device comprising a support, normally separated contacts, mechanical means adapted to be actuated by a passing car for closing said contacts together, a latch adapted to hold them together when so closed, and electromagnetic means controlled by the contacts adapted to trip the latch and maintain the contacts closed independently thereof.

4. A contact device comprising an electromagnet, an armature for said electromagnet, relatively movable contacts adapted to be closed by said armature and engaging each other through an extended range of movement of said armature, a circuit for said electromagnet closed by said contacts, primary operating means for said contacts having a determinate range of operative movement during a portion only of which it is in operative connection with said contacts, and a temporary latch adapted to retain said contacts closed until said electromagnet is energized and said latch tripped upon the energization of said electromagnet, whereby the electromagnet thereafter has exclusive control of said contacts.

5. A contact device comprising an electromagnet, a pair of relatively movable contacts controlled thereby and having a yielding engagement with each other, a primary operating member for said contacts having a determinate range of operative movement during a portion only of which it is in operative engagement with said contacts, a temporary latch retaining said contact in the position to which it is moved by said operating member, and an electric circuit for said electromagnet controlled by said contacts and including electromagnetic tripping means for said temporary latch, whereby said contacts are controlled wholly by said electromagnet after energization of the same.

6. A trolley actuated switch comprising relatively movable contacts, an operating member therefor having two directions of movement and having operative engagement with said contacts in one direction of movement only, an electric circuit controlled by said contacts, a latch controlled from said electric circuit and temporarily active to hold said contacts in the positions to which they are moved by said operating member, but released through said control from the electric circuit.

7. A trolley actuated switch comprising waiting and traveling contacts, an operating member adapted to be moved in a circuitous path, and having operative connection with said traveling contacts through a portion of said path of movement only, the said traveling contacts being freed from said operating member during the remainder of the path of movement of said operating member, an electric circuit closed by said contacts, and a latching device temporarily retaining said contacts closed, but disabled upon the energization of said electric circuit.

8. A contact device comprising a support adapted to be suspended adjacent to a railway track, a trolley hanger carried from said support so as to be moved thereon by a car passing over said track, a pair of contacts initially actuated by the trolley hanger in its movement, a latch for said contacts, and electromagnetic means controlled by said contacts and adapted to trip said latch and maintain the contacts closed independently thereof.

9. A trolley actuated switch comprising relatively movable contacts, an operating member therefor, switching means for said operating member coupling said contacts and said operating member in operative engagement during a portion of the movement of said operating member, and uncoupling said members from operative engagement during the remainder of the movement of said operating member, a latch retaining said contacts in positions to which they are moved during said operative engagement, and a circuit controlled by said contacts including tripping means for said latch.

10. In an electric railway system, track rails, a trolley wire or supply conductor, a fixed support, a movable support carried thereon and secured to said trolley wire or conductor, a pair of contacts adapted to be initially closed by said movable support in its movement due to the pressure of a passing vehicle, a temporary latch retaining said contacts in initial engagement, an electromagnet adapted when energized to maintain said contacts closed, an energizing circuit for said magnet, including said contacts, and electromagnetic means in said circuit to trip said temporary latch.

11. In an electric railway system, track rails, a trolley wire or supply conductor, a fixed support, a movable support carried thereon and secured to said trolley wire or conductor, a pair of contacts adapted to be initially closed by said movable support in its movement due to the pressure of a passing vehicle, a temporary latch for said contacts retaining the same in their position of initial engagement, an electromagnet adapted when energized to maintain said contacts closed, and an energizing circuit for said magnet, including said contacts, and connected at one end to said trolley wire or conductor, at the other end to the track rails or return conductor for the supply circuit, and additional electromagnet means in said circuit to trip said latch and free the contacts therefrom.

12. A contact device for railways comprising a base or support $d$, means for suspending the same over a railway track, a plunger $a$ carried on said support and carrying a hanger $a^4$ for the trolley wire or power supply conductor $a^{40}$, a spring contact $g$ and a mate contact $b^3$, means actuated by the plunger adapted to force said contacts together, a latch $f^2$ adapted to hold them together independently of the plunger, and an electromagnet $b$ adapted to hold them together independently of the latch; together with an energizing circuit for said magnet extending from the hanger $a^4$ through the windings of said electromagnet and through said contacts in series.

13. A contact device for electric railways comprising a base or support $d$, means for suspending the same, a pair of contacts $g$, $b^3$, a plunger $a$ carrying the trolley wire $a^{40}$ and adapted to rise and fall with said trolley wire during the passage of a car, a cam member $b^2$ connected to one of said contacts, and a connecting rod $a'$ carried by the plunger and adapted to act upon said cam and force the contacts together when the plunger rises.

14. A contact device for electric railways comprising a relative fixed base or support, a plunger carrying a trolley hanger adapted to move on said support, a pair of normally separated contacts on the support, an extension member on the plunger adapted to force said contacts together, a latch for the contacts, and a pair of electromagnets carried on the support, one of said magnets adapted when energized to maintain the contacts closed, and the other magnet when energized adapted to trip the latch, means for retarding the retraction of the latch after tripping, and an energizing circuit extending from the trolley hanger through said contacts and the windings of both electromagnets in series.

15. A contact device for railways comprising relatively movable contacts adapted to be closed together initially by the passage of a car along a trackway, a latch for initially holding said contacts closed, a locking electromagnet adapted to maintain said contacts closed, and a latch releasing magnet energized simultaneously with said locking electromagnet to release said latch.

16. A contact device for railways comprising a pair of relatively movable contacts, a movable member adapted to be engaged by a car passing along a trackway to operate said contacts, a latch for initially holding said contacts closed, a locking electromagnet the circuit of which is governed by said contacts and which when energized maintains said contacts closed, and a latch releasing electromagnet energized in series with said locking electromagnet.

17. In a contact device for railways, a pair of circuit controlling contacts, means for initially closing the same together, a latch for initially holding the same closed, a locking electromagnet which maintains the contacts closed, and a slow acting electromagnetically actuated latch releasing means adapted to release said latch when said locking magnet is energized.

18. A contact device for railways comprising two coöperating contacts, a mechanical operating member for closing said contacts, a latch normally biased to a position in which it may hold said contacts closed when once closed by said operating member, a locking magnet for said contacts adapted to lock said contacts closed when energized, a slow acting electromagnetically actuated latch retracting means adapted to move said latch to free said contacts, whereby when said magnets are simultaneously deënergized, the controlled contacts are opened before they are affected by said latch.

19. A contact device for railways comprising a pair of circuit closing contacts, an actuating member therefor having two extremes of operative movement a coupling device engaging said actuating member and said contacts on the forward stroke of said operating member, releasing means for said clutch operative at the extreme end of the forward stroke to disengage said coupling device and to maintain the same in disengagement throughout the return stroke, and latching means for maintaining said contacts temporarily closed after said disengagement.

20. A contact device for railways comprising a pair of coöperating circuit closing contacts, an operating member therefor having two extremes of operative movement, a coupling device between the operating member and the contacts completing operative engagement between said member and said contacts on one stroke of said member, said coupling device comprising a pawl biased to an uncoupling position, and pawl engaging means effecting engagement of said operating member and said pawl through one stroke, said means being inoperative on the other stroke of said operating member, together with latching means for independently retaining said contacts closed upon disengagement of said clutch device.

21. A contact device for railways comprising two coöperating contacts, an operating member therefor adapted to be reciprocated by the passage of a car along the track, a coupling device between said operating member and said contacts engaging said operating member and contacts on the forward reciprocation of said member only, retaining means preventing operative engagement of said coupling device upon the return to normal movement of said contacts, and independent latching means for temporarily maintaining said contacts closed.

22. A contact device for electrical railways comprising circuit closing contacts, an operating member therefor adapted to be reciprocated by the passage of a car along a track, a coupling device between said operating member and said contacts, means to disengage said coupling device upon the initial closure of said contacts, a latch retaining said contacts in their initially closed position, a locking magnet energized through the closure of said contacts for locking the same closed independently of the latch, and means actuated through energization of said locking magnet to release said latch.

23. A trolley actuated switch comprising relatively movable contacts, an operating member therefor having a determinate total range of operative movement but having operative engagement with said contacts through a portion of said movement only, an electric circuit controlled by said contacts, a latch for said contacts biased to engaging position and acting to hold said contacts in the positions to which they are moved by said operating member, and tripping means for said latch controlled from said electric circuit to free the contacts therefrom.

In testimony whereof I affix my signature in presence of two witnesses.

CHARLES W. WARD.

Witnesses:
 JEROME F. PATTERSON,
 JAMES B. HOGE.

Copies of this patent may be obtained for five cents each, by addressing the "Commissioner of Patents, Washington, D. C."